United States Patent [19]
Ginman et al.

[11] Patent Number: 6,004,418
[45] Date of Patent: Dec. 21, 1999

[54] METHOD OF JOINING A COVER MATERIAL TO A SUBSTRATE UTILIZING ELECTRICALLY CONDUCTIVE BONDING

[75] Inventors: Charles D. Ginman, Redford; Kenneth R. Parrish, Detroit, both of Mich.

[73] Assignee: Lear Corporation, Southfield, Mich.

[21] Appl. No.: 08/959,577

[22] Filed: Oct. 28, 1997

[51] Int. Cl.⁶ .............................. B32B 31/20; B32B 31/24
[52] U.S. Cl. .................. 156/212; 156/273.9; 156/275.7; 156/321; 297/180.12; 219/217; 219/528
[58] Field of Search ...................................... 156/212, 214, 156/228, 273.7, 273.9, 275.7, 285, 307.7, 321, 309.6, 307.1; 297/180.12; 219/201, 217, 520, 528, 529

[56] References Cited

U.S. PATENT DOCUMENTS

| | | |
|---|---|---|
| 1,778,183 | 10/1930 | Burke . |
| 2,372,929 | 4/1945 | Blessing . |
| 2,489,643 | 11/1949 | Hunter . |
| 2,952,578 | 9/1960 | Carlson ................................. 156/273.9 |
| 3,094,716 | 6/1963 | Friedman . |
| 3,239,403 | 3/1966 | Williams et al. . |
| 3,277,419 | 10/1966 | Butz . |
| 3,318,636 | 5/1967 | Callum . |
| 3,348,640 | 10/1967 | Thompson et al. . |
| 3,513,050 | 5/1970 | Samuels et al. . |
| 3,657,038 | 4/1972 | Lightfoot . |
| 3,679,534 | 7/1972 | Weinberg . |
| 3,859,504 | 1/1975 | Motokawa et al. . |
| 3,900,654 | 8/1975 | Stinger . |
| 3,964,958 | 6/1976 | Johnston . |
| 4,016,315 | 4/1977 | Szabo . |
| 4,055,526 | 10/1977 | Kiyokawa et al. . |
| 4,058,704 | 11/1977 | Shimizu . |
| 4,250,397 | 2/1981 | Gray et al. . |
| 4,250,398 | 2/1981 | Ellis et al. . |
| 4,284,451 | 8/1981 | Conley . |
| 4,314,144 | 2/1982 | Wojtecki et al. . |
| 4,385,957 | 5/1983 | Wackerle et al. . |
| 4,409,270 | 10/1983 | Faber et al. . |

(List continued on next page.)

FOREIGN PATENT DOCUMENTS

| | | |
|---|---|---|
| 0 052 476 | 5/1982 | European Pat. Off. . |
| 0 0067 621 | 12/1982 | European Pat. Off. . |
| 0 227 202 | 7/1987 | European Pat. Off. . |
| 0 258 827 | 3/1988 | European Pat. Off. . |
| 0 435 045 A2 | 7/1991 | European Pat. Off. . |
| 2 637 534 | 4/1990 | France . |
| 2 678 001 | 12/1992 | France . |
| 2 362 247 | 6/1974 | Germany . |
| 38 31 787 A1 | 4/1989 | Germany . |
| 41 26 188 A1 | 2/1993 | Germany . |
| 196 53 465 C1 | 4/1998 | Germany . |
| WO 94/09684 | 5/1994 | WIPO . |
| WO 95 16577 | 6/1995 | WIPO . |

OTHER PUBLICATIONS

Amoco Performance Products, Inc. Product Brochure, "Amoco Performance Products", "High Thermal Conductivity Pitch based Graphite Fibers", Rev. Mar. 13, 1996, 28 pp.

Eeonyx Corporation Brochure, "Eonomer® Intrinsically Conductive Polymer Technology", Rev. Jan. 1997, 4 pp.

Engelhard Exceptional Technologies Product Brochure, "Flexible Colored Conductive Coatings", 1994, 3 pp.

(List continued on next page.)

*Primary Examiner*—Michael W. Ball
*Assistant Examiner*—Michael A. Tolin
*Attorney, Agent, or Firm*—Brooks & Kushman P.C.

[57] ABSTRACT

The method of producing a cushion assembly includes bonding a foam pad to a cover material with a heat-activatable adhesive layer and an electrically conductive layer therebetween. The cover material is placed in a contoured mold with the adhesive layer and the electrically conductive layer placed thereover and in heat transfer relationship to each other. The foam pad is placed thereover and the electrically conductive layer is energized to heat and activate the heat-activatable adhesive layer to allow bonding between the foam pad, the cover material and the electrically conductive layer.

15 Claims, 4 Drawing Sheets

U.S. PATENT DOCUMENTS

| | | |
|---|---|---|
| 4,416,713 | 11/1983 | Brooks . |
| 4,421,582 | 12/1983 | Horsma et al. . |
| 4,429,215 | 1/1984 | Sakai et al. . |
| 4,560,428 | 12/1985 | Sherrick et al. . |
| 4,629,868 | 12/1986 | Svensson . |
| 4,692,199 | 9/1987 | Kozlowski et al. . |
| 4,697,064 | 9/1987 | Altmann . |
| 4,722,760 | 2/1988 | Shimada . |
| 4,734,147 | 3/1988 | Moore . |
| 4,840,430 | 6/1989 | Shimada . |
| 5,129,977 | 7/1992 | Leatherman . |
| 5,238,513 | 8/1993 | Gill . |
| 5,286,325 | 2/1994 | Miyota et al. . |
| 5,372,667 | 12/1994 | Miyota et al. . |
| 5,425,836 | 6/1995 | Shimada et al. . |
| 5,486,252 | 1/1996 | Wong . |
| 5,534,097 | 7/1996 | Fasano et al. . |
| 5,591,291 | 1/1997 | Blackmore . |
| 5,643,385 | 7/1997 | Kikuchi et al. . |
| 5,792,291 | 8/1998 | Ormachea . |

OTHER PUBLICATIONS

Milliken & Company, "Characterization And Application Of Polypyrrole–Coated Textiles", by H.H. Kuhn, Intrinsically Conducting Polymers: An Emerging Technology, © 1993 Kluwer Academic Publishers, pp. 25–34.

Milliken & Company Product Brochure, "Contex® Conductive Textiles", 2 pp.

Milliken & Company Product Brochure, "Contex® Conductive Textiles", 2 pp.

Monsanto Corporation Product Brochure, "Versicon Conductive Polymer", Jul. 1996, 13 pp.

Patents Abstracts of Japan, vol. 009, No. 192 (C–296), Aug. 8, 1985 & JP 60 063267 A (Sumitomo Denki Kogyo KK), Apr. 11, 1985.

Patent Abstracts of Japan, vol. 018, No. 217 (M–1549), Apr. 19, 1994 & JP 06 015069 A (Tokyo Seat KK), Jan. 25, 1994.

English translation of German Application No. 4126188 A1.

6,004,418

METHOD OF JOINING A COVER MATERIAL TO A SUBSTRATE UTILIZING ELECTRICALLY CONDUCTIVE BONDING

TECHNICAL FIELD

This invention relates to the joining of a cover material to a substrate of the type utilized for automotive interior parts.

BACKGROUND ART

Various techniques have been developed for joining a cover material to a substrate, particularly for use in automotive seat fabrication. U.S. Pat. No. 4,692,199, assigned to the assignee of the present invention, shows a method that utilizes steam to melt an adhesive film in order to bond a cloth fabric layer to a foam pad. In this method, the steam penetrates the fabric layer to activate the adhesive film.

U.S. Pat. No. 5,534,097, assigned to the assignee of the present invention and hereby incorporated by reference, shows a method that utilizes a magnetic flux to melt an adhesive film containing ferromagnetic particles to bond a fabric or trim cover to a foam cushion. An oscillatory radio frequency generator is used to energize copper coil tubing to produce the magnetic flux. The magnetic flux induces eddy currents in the ferromagnetic particles in order to generate heat to activate the adhesive film.

SUMMARY OF THE INVENTION

The method of the present invention enables the joining of virtually any type of cover material to a substrate utilizing an efficient heat transfer process, and without requiring additional finishing steps for the cover material or significant equipment costs, and without causing a substantial reduction in the thickness of the substrate.

The method of joining a cover material having an appearance portion and a concealable portion to a substrate comprises positioning a heat-activatable adhesive layer and an electrically conductive layer between the cover material and the substrate with the heat-activatable adhesive layer and the electrically conductive layer in heat transfer relationship to each other, energizing the electrically conductive layer to generate heat, and joining the cover material and the substrate together sufficiently with the heat-activatable adhesive layer and the electrically conductive layer therebetween such that heat from the electrically conductive layer activates the heat-activatable adhesive layer for adhering the concealable portion of the cover material, the electrically conductive layer and the substrate to one another while exposing the appearance portion of the cover material.

Accordingly, it is an object of the present invention to provide a method of the type described above in which heat is transferred efficiently between the electrically conductive layer and the adhesive layer.

Another object of the present invention is to provide a method of the type described above which does not require additional finishing steps for the cover material.

Another object of the present invention is to provide a method of the type described above which does not involve significant equipment costs.

Still another object of the present invention is to provide a method of the type described above in which the electrically conductive layer is configured as a seat heater that can be used to heat the seat after the cover material, the electrically conductive layer and the substrate have been joined to one another.

It is yet another object of the present invention to provide an article produced by the method of the type described above, particularly an article for use in the interior of an automobile.

These and other objects, features and advantages of the present invention are readily apparent from the following detailed description of the best mode for carrying out the invention when taken in conjunction with the accompanying drawings.

BEST MODE FOR CARRYING OUT THE INVENTION

Figure 1:
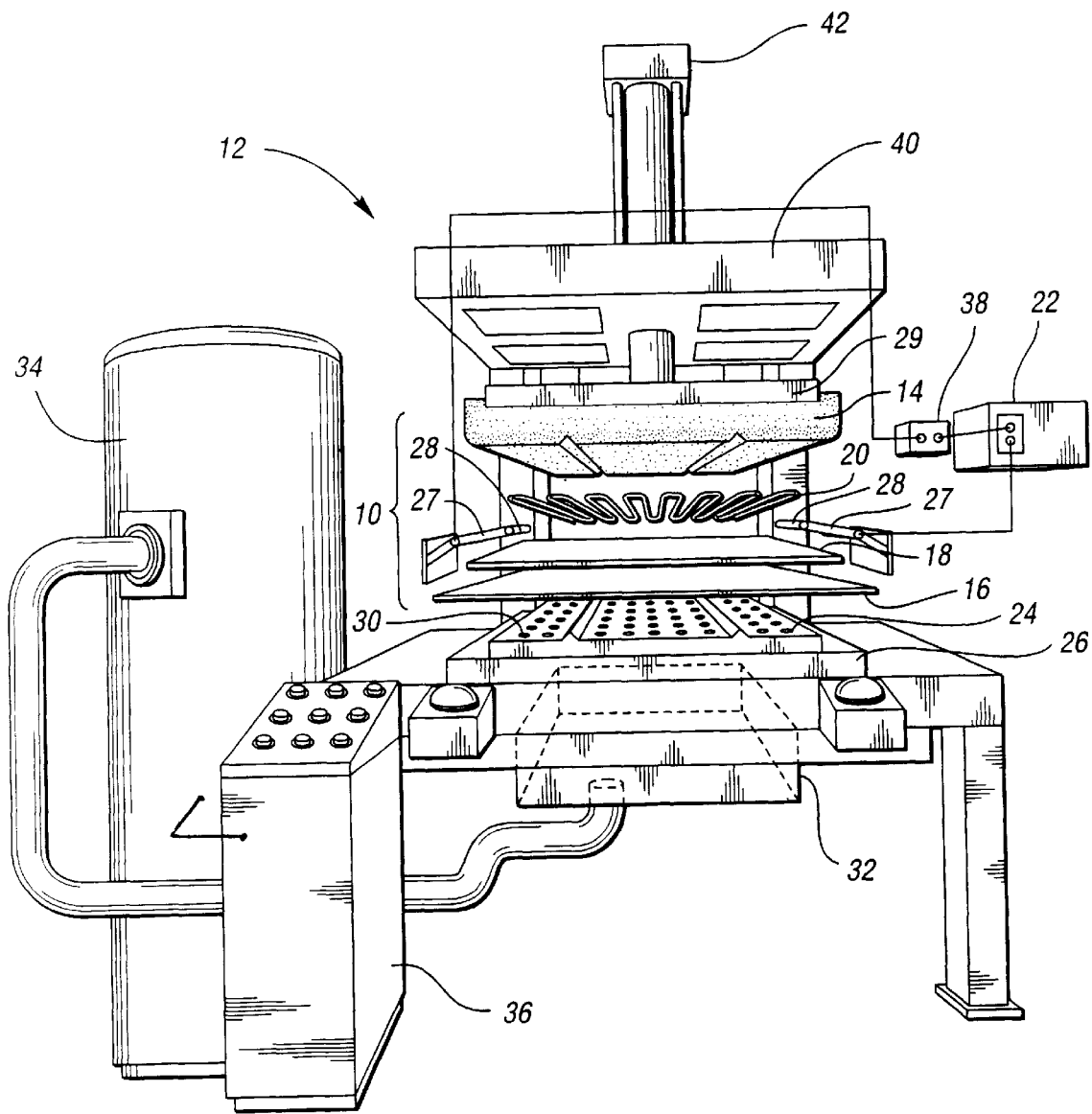
FIG. 1 is a front perspective view of an assembly for practicing the method according to the present invention.
Figure 2:
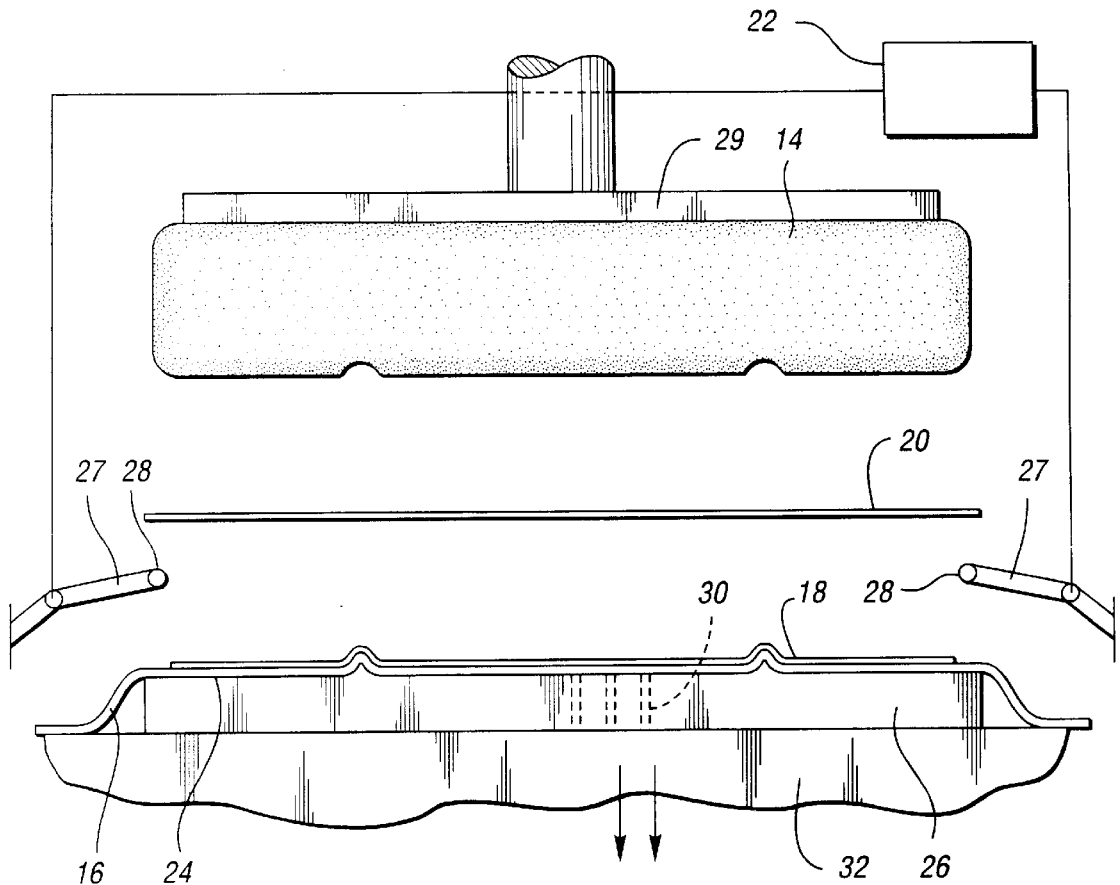
FIG. 2 is a schematic diagram showing a foam pad, an electrically conductive layer, an adhesive layer and a cover material in a mold.
Figure 3:
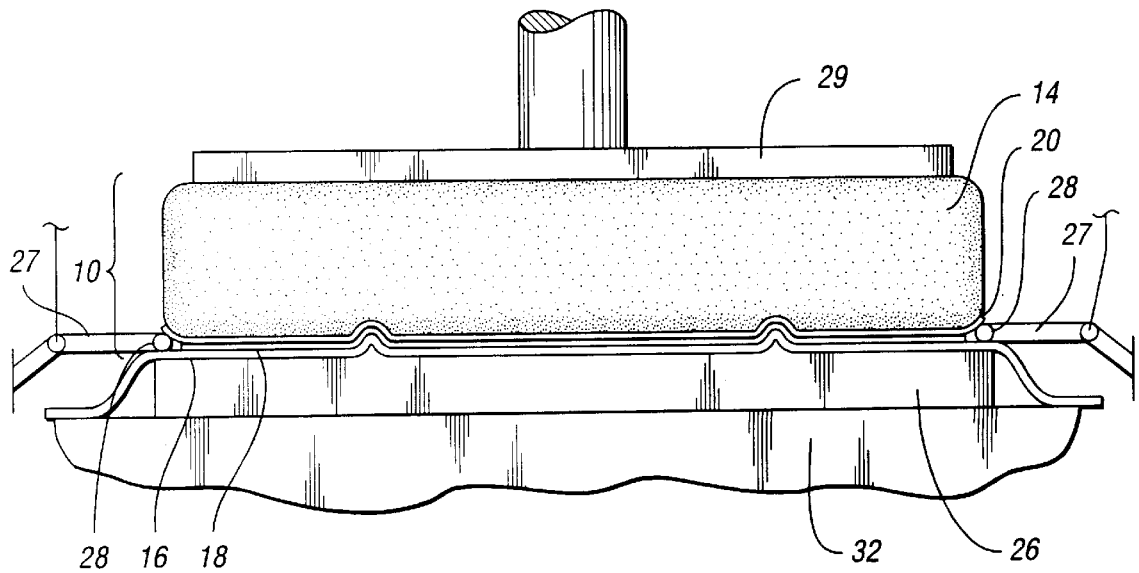
FIG. 3 is a schematic diagram showing the foam pad, the electrically conductive layer and the cover material compressed against one another for bonding by the adhesive layer.

With reference to the drawings, the preferred embodiments of the present invention will be described. A method according to the present invention of fabricating a cushion assembly 10 generally utilizes an apparatus 12 as illustrated in FIGS. 1–3. The apparatus 12 is utilized to produce the cushion assembly 10 by bonding a substrate, such as a foam pad 14, to a trim cover material 16 with a heat-activatable adhesive layer 18 and an electrically conductive layer 20 therebetween. The cushion assembly 10 is typically utilized as a seat bottom or a seat back in seat assemblies for motor vehicles.

The apparatus 12 includes a mold 26 having a contoured mold surface 24. A plurality of apertures 30 are disposed in the mold surface 24 for establishing fluid communication within the mold 26. A housing 32 disposed generally below the mold surface 24 provides an air-tight chamber in fluid communication with the apertures 30. The mold preferably comprises aluminum, ceramic, epoxy-resin or other suitable mold material. A vacuum source 34 connected to the housing 32 is adapted to develop a vacuum pressure in the housing 32 and at the apertures 30 of the mold 26. The vacuum source 34 typically includes a vacuum pump and tank connected by fluid lines to the housing 32, and is controlled by a control circuit 36.

An upper platen 29 is adapted to compress the foam pad 14 against the cover material 16 on the mold 26. The upper platen 29 is suspended from a horizontal support structure 40. A pneumatic cylinder 42 is mounted to the horizontal support structure 40 and effectuates vertical movement of the upper platen 29 relative to the mold 26 for compressing the foam pad 14 against the mold 26. Further details of the apparatus 12 are disclosed in U.S. Pat. No. 4,692,199, assigned to the assignee of the present invention and hereby incorporated by reference.

The cover material 16 is placed on the mold surface 24 of the porous mold 26. The cover material 16 may be any type of permeable or non-permeable upholstery used in the manufacture of seats or other automotive interior parts such as cloth, fabric, vinyl or leather. Leather or vinyl layers are particularly suitable for this process since heat is not directly applied to the appearance portion of the cover material. The cover material 16 is sewn or otherwise formed to the desired final seat shape before it is placed on the mold surface 24.

The mold surface 24 is preferably of a suitable contour conforming to the contour of the seat surface. In the case of a non-permeable cover material 16, a vacuum pressure is developed by the vacuum source 34 and applied over the mold surface 24 to draw the cover material 16 against the mold surface 24. Thereafter, any wrinkles in the cover material 16 may be manually or otherwise removed.

Next, the heat-activatable adhesive layer 18 and the electrically conductive layer 20 are manually or otherwise placed in heat transfer relationship to each other and over the cover material 16. In the case of a permeable cover material 16, the adhesive layer 18 preferably comprises a relatively air impervious barrier that is placed sufficiently adjacent the cover material 16 such that when the vacuum pressure is developed, the adhesive layer 18 is drawn toward the mold surface 24, which in turn draws the cover material 16 against the mold surface.

Figure 4:
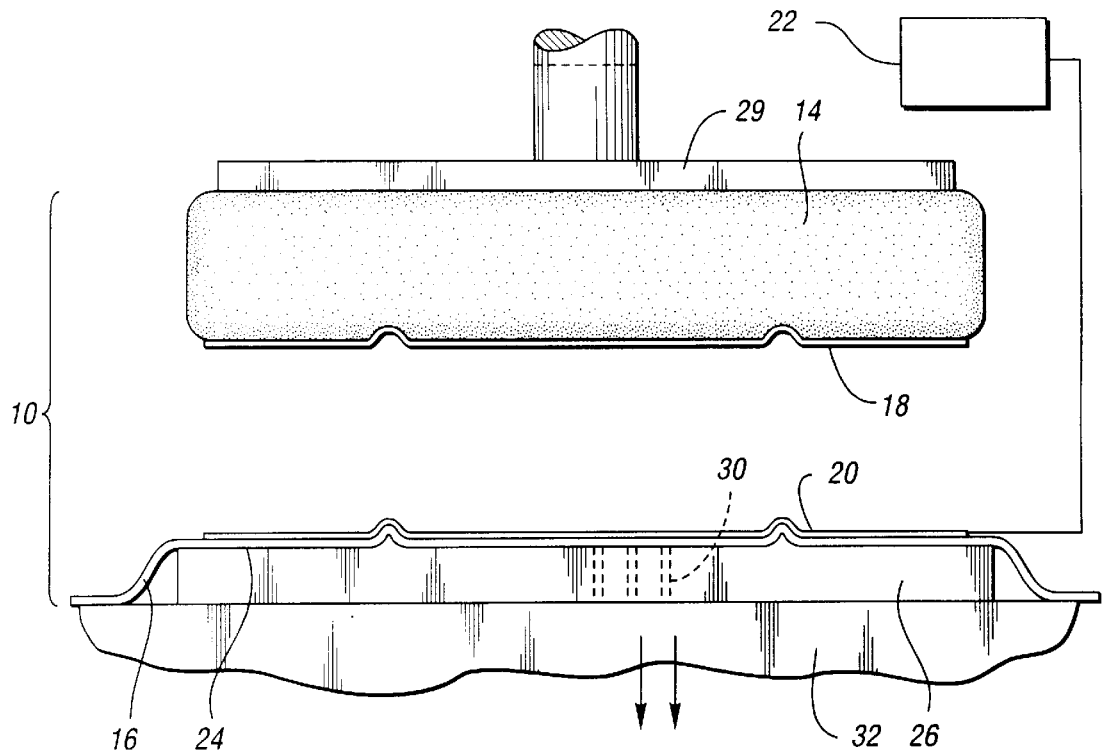
FIG. 4 is a schematic diagram of an alternative embodiment of the assembly showing the adhesive layer integrally pre-formed with the foam pad and the electrically conductive layer integrally pre-formed with the cover material.
Figure 5:
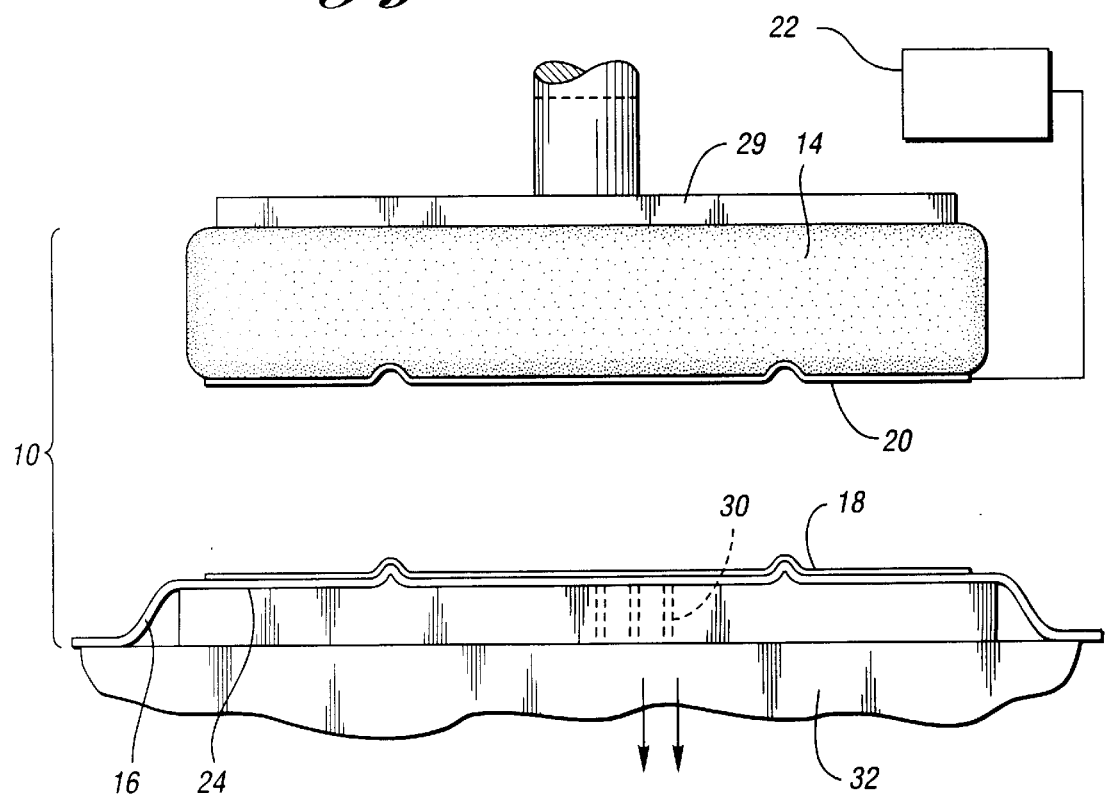
FIG. 5 is a schematic diagram of another alternative embodiment of the assembly showing the adhesive layer integrally pre-formed with the cover material and the electrically conductive layer integrally pre-formed with the foam pad.
Figure 6:
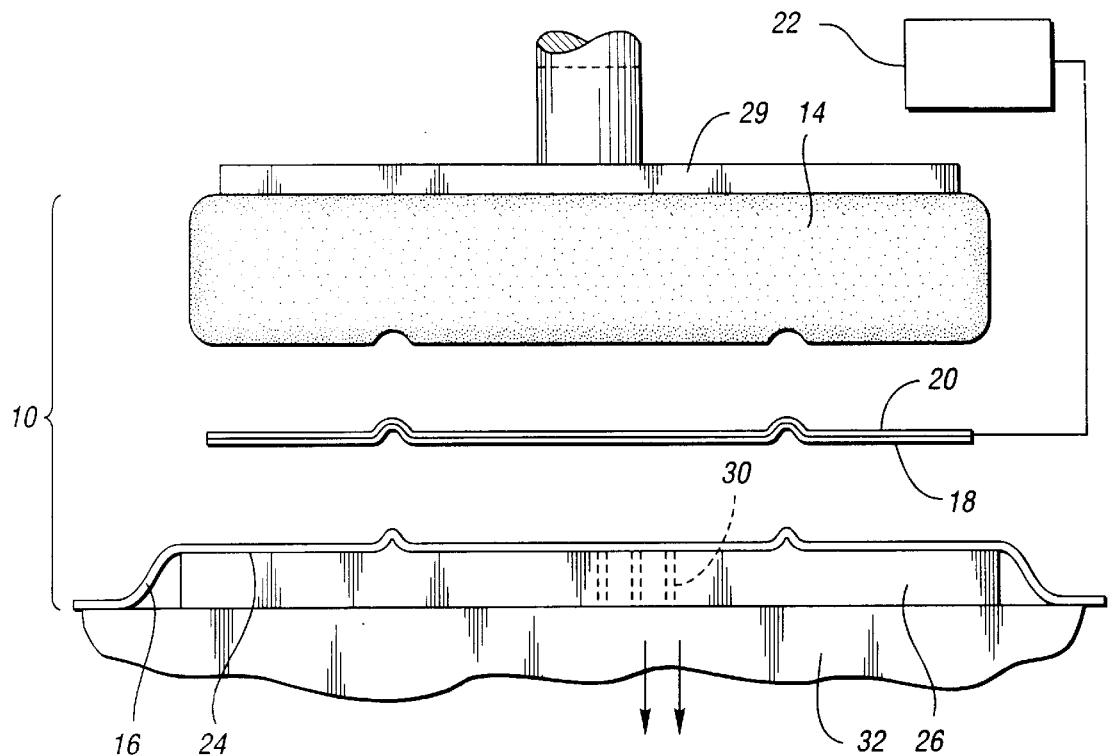
FIG. 6 is a schematic diagram of still another alternative embodiment of the assembly showing the adhesive layer integrally pre-formed with the electrically conductive layer.

The adhesive layer 18 may be a separate layer or it may be integrally pre-formed with either the foam pad 14 as shown in FIG. 4, the cover material 16 as shown in FIG. 5, or the electrically conductive layer 20 as shown in FIG. 6. The adhesive layer 18 may comprise a thermosetting resin of the reactive type, such as Bostic 812 adhesive available from Bostic Inc. of Middleton, Mass. The adhesive layer 18 may comprise a thermoplastic resin, such as product code 4232 available from Bemis Corp. of Shirley, Mass.

The electrically conductive layer 20 may be a separate layer or it may be pre-laminated or otherwise integrally pre-formed to either the cover material 16 as shown in FIG. 4, the foam pad 14 as shown in FIG. 5, or the adhesive layer 18 as shown in FIG. 6. It is not necessary that the electrically conductive layer 20 be flush against the surface of the layer with which it is pre-formed. In other words, the electrically conductive layer 20 may project out from the surface of the layer with which it is pre-formed.

The electrically conductive layer 20 is preferably sufficiently flexible to form a contour similar to and complimenting the mold surface 24 and the foam pad 14. The electrically conductive layer 20 may be any type of material capable of being energized to at least the activation temperature of the heat-activatable adhesive layer 18. For example, the electrically conductive layer 20 may be made with metal coils or fibers, carbon fibers, an electrically conductive coating applied to a surface, electrically conductive polymers, or any combination thereof.

Metal coils or fibers may be woven together to form a mesh, woven into or otherwise combined with a fabric, or otherwise pre-formed in a layer such as available from I. G. Bauerhin GmbH of Gruendau, Germany. Carbon fibers, such as P25 2K ST fibers available from Amoco Polymers of Hampton, N.H., may be woven together to form a mesh, woven into or otherwise combined with a fabric, or formed into a carbon slurry paper. An electrically conductive coating, such as M574 conductive ink available from Engelhard Corporation of Carteret, N.J., may be applied to, for example, the foam pad 14, the cover material 16, or the adhesive layer 18. Electrically conductive polymers may be formed into a separate layer or added to, for example, the foam pad 14, the cover material 16 or the adhesive layer 18. Electrically conductive polymers include such products as inherently conductive polymers available from Monsanto Co. of St. Louis, Mo., Eeonomer™ KP20-7DN and Eeonomer™ KPY20-7D available from Eeonyx Corporation of Pinole, Calif., Contex™ conductive textiles available from Milliken & Company of Spartanburg, South Carolina, and electronically conductive polymer films available from the Department of Chemistry of Drexel University, located in Philadelphia, Pa.

The electrically conductive layer 20 may also be configured as a seat heater which an occupant of the vehicle can activate to warm the seat during use. The electrically conductive layer 20 in this arrangement may be made from any of the above described materials or it may be as typical and commonly known in the art for use in heating vehicle seats. Such electrically conductive layer 20 may be of the type generally comprising exposed and coiled copper wiring, insulated or non-insulated, and encapsulated in woven or non-woven material, such as is commonly available from Forsheda, Inc. of MullesjÖ, Sweden. Other types of electrically conductive layers 20 may also be used as seat heaters as understood by those skilled in the art.

Next, the electrically conductive layer 20 is connected to a power source 22, which may be an alternating current or direct current power source, by engaging opposed electrical circuit clamps 27 against the electrically conductive layer 20. Each electric circuit clamp 27 includes a bus bar 28 that engages substantially an entire edge of the electrically conductive layer 20. Alternatively, the electrically conductive layer 20 may be connected to the power source 22 by utilizing alligator clips, a quick disconnect, or by any other means as understood by those skilled in the art.

The foam pad 14 is then placed over the electrically conductive layer 20 on the mold 26. The foam pad 14 may be of various known materials now utilized as cushion materials, such as the polyester-type or the polyurethane-type. Other substrate materials now utilized in the manufacture of other automotive interior parts may also be utilized in the method according to the present invention to produce seat cushions or automotive interior parts such as headliners, door panels, trunk liners and floor covers.

The electrically conductive layer 20 may be energized by the power source 22 to generate heat either before or after placing the foam pad 14 thereover. In either case, the electrically conductive layer 20 is energized to at least the activation temperature of the heat-activatable adhesive layer 18. For a thermoplastic adhesive layer, such temperature is usually higher than the normal operating temperature of the electrically conductive layer 20 when used as a seat heater. For example, the activation temperature of a thermoplastic adhesive layer may be 220° F. or greater, and the normal operating temperature of the electrically conductive layer 20 as a seat heater may be 100° to 120° F. For a thermosetting adhesive layer, the activation temperature may be lower than the operating temperature of the electrically conductive layer 20 when used as a seat heater.

The upper platen 29 is moved down against the foam pad 14 to compress the foam pad against the cover material 16 with the adhesive layer 18 and the electrically conductive layer 20 therebetween. The compressive force applied by the upper platen 29 may be from about 0.1 to about 10 pounds per square inch, and is preferably in the range of 2.5 to 5 pounds per square inch. Additional testing, however, may result in changes to the preferable compressive force range.

Next, the heat from the electrically conductive layer 20 melts the adhesive layer 18 such that at least a sufficient portion of the adhesive layer is diffused into the foam pad 14, the electrically conductive layer 20 and the cover material 16. After the heat is removed and the adhesive cures, the foam pad 14, the electrically conductive layer 20 and the cover material 16 are bonded to one another to produce the finished cushion assembly.

It is desirable to maintain a constant amount of heat emanating from the electrically conductive layer 20 in order to ensure proper activation of the heat activatable adhesive layer 18. This is preferably accomplished by utilizing a conventional current controller 38, as shown in FIG. 1, in conjunction with the power source 22. Because the resistivity of the electrically conductive layer 20 may change with temperature, it may be necessary to change the amount of current passing through the electrically conductive layer 20 in order to maintain a constant amount of heat emanating from the electrically conductive layer 20. Thus the resistivity of the electrically conductive layer 20 may be periodically measured and the current controller adjusted to regulate the voltage across the electrically conductive layer 20. Because the electrically conductive layer 20 is adjacent to the adhesive layer 18, the heat transfer efficiency therebetween is maximized. As a result, the heating time and the amount of heat required for this method are minimized.

Other means of maintaining a constant amount of heat emanating from the electrically conductive layer 20 may be utilized. These include utilizing a thermocouple to measure the temperature of the electrically conductive layer 20, and adjusting the voltage applied to the electrically conductive layer 20 as necessary to maintain a constant temperature of the electrically conductive layer 20.

After the cushion assembly has been bonded together, the electrically conductive layer 20 may be re-energized to debond the cushion assembly 10 in order to remove any wrinkles in the cover material 16. A cross-linking adhesive medium may be utilized in order to minimize the amount of thermal energy needed to bond or debond the assembly 10. Cooling means, such as the vacuum 34, may also be applied to assist the cooling and curing of the bonded seat cushion assembly 10. Depending on the thermal inertia of the cushion assembly 10, however, this cooling step may not be required.

Figure 7:
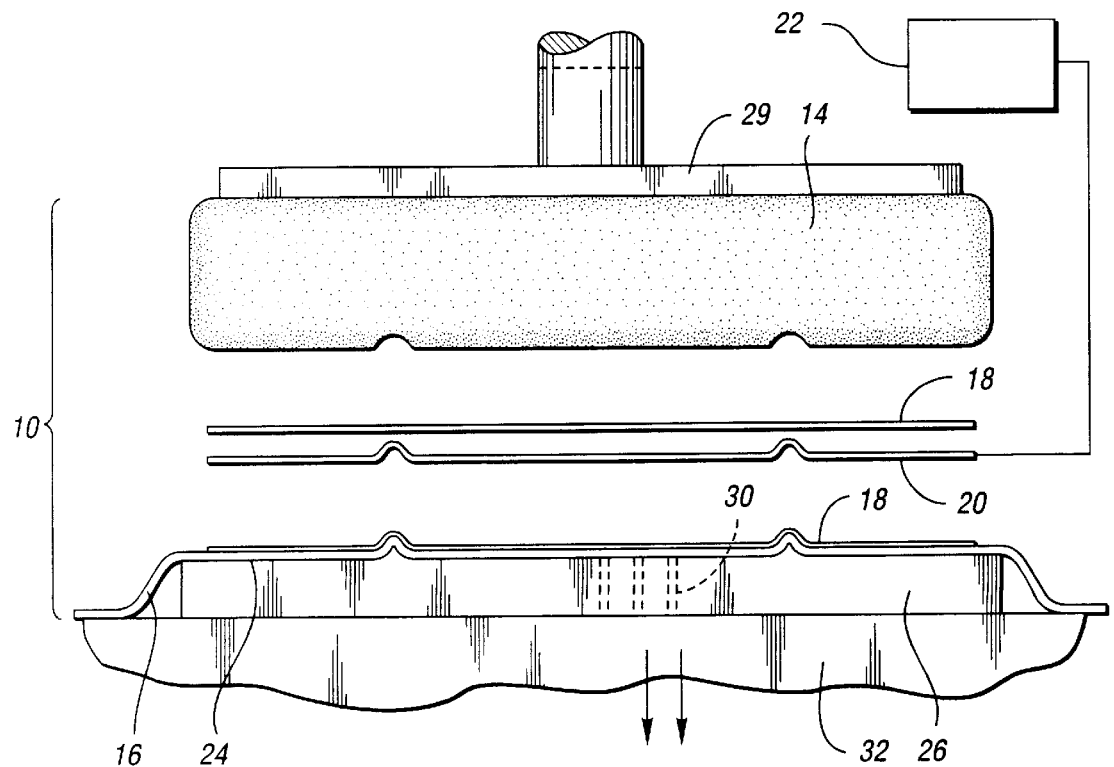
FIG. 7 is a schematic diagram of yet another alternative embodiment of the assembly showing the electrically conductive layer between a pair of adhesive layers.

FIG. 7 shows an alternative embodiment of the method according to the present invention, which includes placing the electrically conductive layer 20 between a pair of adhesive layers 18. One adhesive layer 18 is placed over the cover material 16, or between the cover material 16 and the electrically conductive layer 20. The other adhesive layer 18 is placed over the electrically conductive layer 20, or between the electrically conductive layer 20 and the surface of the foam pad 14. Placing an adhesive layer 18 on each side of the electrically conductive layer 20 provides additional bonding of the electrically conductive layer 20 to both the foam pad 14 and the cover material 16.

The Figures indicate that the adhesive bond is disposed over the entire surface of the foam pad 14, the electrically conductive layer 20 and the cover material 16. However, in accordance with the subject application, the adhesive bonds between the foam pad 14, the electrically conductive layer 20 and the cover material 16 may constitute only a portion of the mating surface, as commonly known in the art.

The invention has been described in an illustrative manner, and it is to be understood that the terminology which has been used is intended to be in the nature of words of description rather than of limitation. Obviously, many modifications and variations of the present invention are possible in light of the above teachings. For example, the cushion assembly may be used in seats for applications other than motor vehicles. Furthermore, the present invention can be utilized to produce other interior automotive parts which require a substrate being bonded to a cover material, including headliners, door panels, trunk liners and floor covers. It is, therefore, to be understood that within the scope of the appended claims, the invention may be practiced otherwise than as specifically described.

What is claimed is:

1. A method of joining a foam pad to a cover material having an appearance portion and a concealable portion, the method comprising:

forming the foam pad such that the foam pad includes an integrally formed electrically conductive polymer;

positioning a heat-activatable adhesive layer between the cover material and the foam pad such that said heat-activatable adhesive layer and said electrically conductive polymer are in heat transfer relationship to each other;

energizing said electrically conductive polymer to generate heat; and joining the cover material and the foam pad together sufficiently with said heat-activatable adhesive layer therebetween such that heat from said electrically conductive polymer activates said heat-activatable adhesive layer for adhering the concealable portion of the cover material and the foam pad to one another while exposing the appearance portion of the cover material.

2. The method of claim 1 wherein the cover material comprises a fabric.

3. The method of claim 1 wherein the cover material comprises leather.

4. The method of claim 1 wherein the cover material comprises vinyl.

5. The method of claim 1 wherein said step of joining the cover material and the foam pad together comprises forcing the cover material and the foam pad together.

6. The method of claim 1 further comprising integrally pre-forming said heat-activatable adhesive layer with the cover material.

7. The method of claim 1 further comprising integrally pre-forming said heat-activatable adhesive layer with the foam pad.

8. The method of claim 1 further comprising configuring said electrically conductive polymer as a seat heater for heating a seat.

9. The method of claim 1 further comprising placing the cover material and said heat-activatable adhesive layer on a contoured mold surface of a mold.

10. The method of claim 9 further comprising applying a vacuum pressure over the contoured mold surface to draw the cover material and said heat-activatable adhesive layer against the contoured mold surface and in contour therewith.

11. A method of fabricating a seat cushion assembly, the method comprising:

providing a cover material;

forming a foam pad such that said foam pad includes an integrally formed electrically conductive polymer;

positioning a heat-activatable adhesive layer between said cover material and said foam pad with said heat-activatable adhesive layer and said electrically conductive polymer in heat transfer relationship to each other;

energizing said electrically conductive polymer to generate heat; and joining said cover material and said foam pad together sufficiently with said heat-activatable adhesive layer therebetween such that heat from said electrically conductive polymer activates said heat-activatable adhesive layer for adhering said cover material and said foam pad to one another.

12. The method of claim 11 further comprising configuring said electrically conductive polymer as a seat heater for heating a seat.

13. The method of claim 11 further comprising placing said cover material and said heat-activatable adhesive layer on a contoured mold surface of a mold.

14. The method of claim 13 further comprising applying a vacuum pressure over the contoured mold surface to draw said cover material and said heat-activatable adhesive layer against the contoured mold surface and in contour therewith.

15. A method of fabricating a seat cushion assembly, the method comprising:

forming a foam pad such that the foam pad includes an integrally formed electrically conductive polymer;

positioning a cover material over a contoured mold surface of a mold;

positioning a heat-activatable adhesive layer and said foam pad in said mold with said adhesive layer and said electrically conductive polymer in heat transfer relationship to each other;

applying a vacuum pressure over said contoured mold surface to draw said cover material and said heat-activatable adhesive layer against said contoured mold surface and in contour therewith;

applying a power source to said electrically conductive polymer to heat said electrically conductive polymer; and forcing said cover material and said foam pad together in said mold with said heat-activatable adhesive layer therebetween such that heat from said electrically conductive polymer activates said heat-activatable adhesive layer for adhering said cover material and said foam pad to one another.

* * * * *